United States Patent
Rhodes et al.

(10) Patent No.: US 10,954,422 B2
(45) Date of Patent: Mar. 23, 2021

(54) WELDABLE AND VIBRATION DAMPING SILICONE ADHESIVES

(71) Applicant: Avery Dennison Corporation, Glendale, CA (US)

(72) Inventors: Susan M. Rhodes, Concord, OH (US); Michel Ravers, Antwerp (BE); Ingrid E. Geuens, Ranst (BE); Qianchun Li, Antwerp (BE)

(73) Assignee: Avery Dennison Corporation, Glendale, CA (US)

( * ) Notice: Subject to any disclaimer, the term of this patent is extended or adjusted under 35 U.S.C. 154(b) by 341 days.

(21) Appl. No.: 15/518,581

(22) PCT Filed: Oct. 13, 2015

(86) PCT No.: PCT/US2015/055360
§ 371 (c)(1),
(2) Date: Apr. 12, 2017

(87) PCT Pub. No.: WO2016/061121
PCT Pub. Date: Apr. 21, 2016

(65) Prior Publication Data
US 2017/0218239 A1 Aug. 3, 2017

Related U.S. Application Data

(60) Provisional application No. 62/142,590, filed on Apr. 3, 2015, provisional application No. 62/063,172, filed on Oct. 13, 2014.

(51) Int. Cl.
| | |
|---|---|
| *C09J 183/04* | (2006.01) |
| *C09J 5/10* | (2006.01) |
| *C09J 9/02* | (2006.01) |
| *C09J 7/22* | (2018.01) |
| *C09J 7/38* | (2018.01) |
| *B32B 7/12* | (2006.01) |
| *C09J 11/04* | (2006.01) |
| *C08K 3/08* | (2006.01) |
| *C08K 9/02* | (2006.01) |
| *C08K 3/04* | (2006.01) |
| *C08K 5/14* | (2006.01) |

(52) U.S. Cl.
CPC ............. *C09J 183/04* (2013.01); *B32B 7/12* (2013.01); *C09J 5/10* (2013.01); *C09J 7/22* (2018.01); *C09J 7/38* (2018.01); *C09J 9/02* (2013.01); *C09J 11/04* (2013.01); *B32B 2405/00* (2013.01); *C08K 3/04* (2013.01); *C08K 3/08* (2013.01); *C08K 5/14* (2013.01); *C08K 9/02* (2013.01); *C08K 2003/0812* (2013.01); *C08K 2201/001* (2013.01); *C08K 2201/005* (2013.01); *C09J 2301/208* (2020.08); *C09J 2301/302* (2020.08); *C09J 2301/314* (2020.08); *C09J 2301/408* (2020.08); *C09J 2483/00* (2013.01)

(58) Field of Classification Search
None
See application file for complete search history.

(56) References Cited

U.S. PATENT DOCUMENTS

| | | | |
|---|---|---|---|
| 1,957,597 | A | 5/1934 | Johnson |
| 3,110,691 | A | 11/1963 | Fisher |
| 3,118,048 | A | 1/1964 | Fisher et al. |
| 3,193,049 | A | 7/1965 | Wollek |
| 3,687,739 | A | 8/1972 | Kennedy et al. |
| 4,353,951 | A | 10/1982 | Yuitoshi et al. |
| 4,584,355 | A | 4/1986 | Blizzard et al. |
| 5,170,930 | A | 12/1992 | Dolbear et al. |
| 5,275,856 | A | 1/1994 | Calhoun et al. |
| 5,726,256 | A | 3/1998 | Benson et al. |
| 5,820,940 | A | 10/1998 | Gorynin et al. |
| 5,869,556 | A | 2/1999 | Cifuentes et al. |
| 6,117,284 | A | 9/2000 | Mueller |
| 6,228,456 | B1 | 5/2001 | Butterbach et al. |
| 6,235,385 | B1 | 5/2001 | Lee |
| 6,361,716 | B1 | 3/2002 | Kleyer et al. |
| 6,576,327 | B1 | 6/2003 | Weissmann et al. |
| 6,641,923 | B2 | 11/2003 | Sadvary et al. |
| 6,703,120 | B1 * | 3/2004 | Ko .................. C09J 183/04 428/355 R |
| 6,790,520 | B1 | 9/2004 | Todd et al. |
| 6,828,020 | B2 | 12/2004 | Fisher et al. |
| 7,147,897 | B2 | 12/2006 | Pawlik et al. |
| 8,431,206 | B2 | 4/2013 | Kim |

(Continued)

FOREIGN PATENT DOCUMENTS

| | | |
|---|---|---|
| CN | 1590457 | 3/2005 |
| CN | 1950459 | 4/2007 |

(Continued)

OTHER PUBLICATIONS

Donatas Satas (ed), "Handbook of Pressure Sensitive Adhesive Technology", 1999, Satas & Associates, 3rd edition, pp. 550-555. (Year: 1999).*
Suzuki, Hironori, "Conductive Adhesive Composition", English translation JP 2004-119254 A, Apr. 15, 2004 (Year: 2004).*
International Search Report and Written Opinion issued in corresponding IA No. PCT/US2015/055360 dated Dec. 15, 2015.
International Preliminary Report on Patentability dated Apr. 27, 2017 issued in corresponding IA No. PCT/US2015/055360 filed Oct. 13, 2015.

*Primary Examiner* — Anish P Desai

(57) ABSTRACT

Weldable adhesive compositions that dampen noise or vibration are described. In addition, various tape products that include the adhesive compositions are described. Also described are various methods of damping noise or vibration by use of the adhesive compositions and tapes. In addition, vibration damping assemblies utilizing the adhesives are described.

22 Claims, 11 Drawing Sheets

(56) References Cited

U.S. PATENT DOCUMENTS

| | | |
|---|---|---|
| 8,465,834 B2 | 6/2013 | Kim |
| 8,680,406 B2 | 3/2014 | Chua |
| 8,796,580 B2 | 8/2014 | Mizrahi |
| 2002/0035934 A1 | 3/2002 | Boucher et al. |
| 2004/0041131 A1 | 3/2004 | Fukushima |
| 2006/0199019 A1 | 9/2006 | Oh et al. |
| 2007/0110942 A1 | 5/2007 | Shah et al. |
| 2007/0207311 A1 | 9/2007 | Klauck et al. |
| 2008/0102240 A1 | 5/2008 | Serra et al. |
| 2008/0206544 A1 | 8/2008 | Kim et al. |
| 2011/0206923 A1 | 8/2011 | Liu et al. |
| 2012/0172543 A1 | 7/2012 | Cray et al. |
| 2013/0260171 A1 | 10/2013 | Harkins |
| 2014/0048199 A1 | 2/2014 | Kim et al. |

FOREIGN PATENT DOCUMENTS

| | | | |
|---|---|---|---|
| CN | 101107337 | 1/2008 | |
| GB | 2504957 A * | 2/2014 | ............... C09J 5/06 |
| JP | 2002-088337 | 3/2002 | |
| JP | 2004-091750 | 3/2004 | |
| JP | 2004-119254 | 4/2004 | |
| WO | 2009/081415 | 7/2009 | |
| WO | WO-2012129264 A1 * | 9/2012 | ............ C09J 183/04 |

* cited by examiner

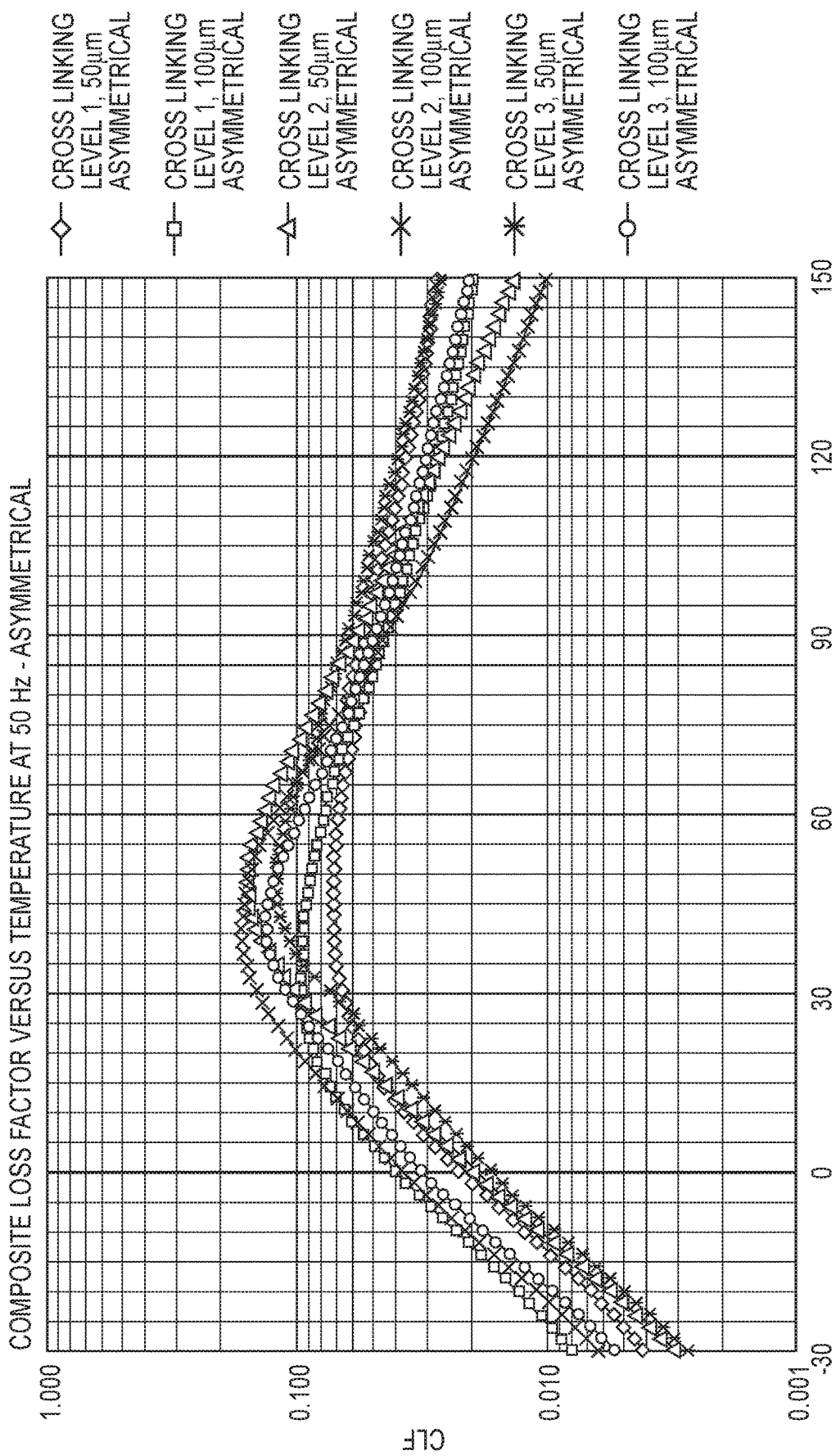

WELDABLE AND VIBRATION DAMPING SILICONE ADHESIVES

CROSS-REFERENCE TO RELATED APPLICATIONS

The present application is a 371 of International Application No. PCT/US15/55360, which was published in English on Apr. 21, 2016, and claims the benefit of U.S. Provisional Patent Application No. 62/063,172 filed Oct. 13, 2014, and U.S. Provisional Patent Application No. 62/142,590 filed Apr. 3, 2015 all of which are incorporated herein by reference in their entireties.

FIELD

The present subject matter relates to silicone pressure sensitive adhesive (PSA) compositions, their methods of preparation, and their use, which exhibit noise or vibration damping properties, and particularly such adhesives which are weldable.

BACKGROUND

Welding is a process used to join materials, typically metals, by melting the workpieces and adding a filler material to form a pool of molten material, i.e., the weld pool, that upon cooling and solidification, forms a strong joint or "weld." Many different energy sources can be used for welding. However, for many applications an electrical current is used.

Prior to welding, many workpieces are stored or otherwise retained until they are needed. Since most workpieces to be welded are metal, any exposed metal surfaces are subject to corrosion. Thus, weldable anticorrosion compositions or "primers" were developed. These coatings can be applied to metal workpieces prior to welding, and serve to protect the workpiece from corrosion. Weldable primer compositions typically contain one or more electrically conductive fillers dispersed in a resinous matrix. The electrically conductive fillers facilitate electric welding of the coated workpieces. Representative weldable compositions are described in U.S. Pat. Nos. 3,110,691; 3,118,048; and 3,687,739 for example.

In fabricating metal structures, vehicle assemblies, and other metal components, adhesives have been used to join metal panels or parts together. The use of adhesives can improve the overall strength and rigidity of the resulting assembly, and lead to an assembly having a lower cost and reduced weight as compared to using mechanical fasteners. Metal assemblies have also been formed using a combination of welding certain components and joining other components using adhesives.

Thus, weldable adhesives have been developed. Weldable adhesives enable adhesive bonding and weld formation at a common location. Combining the benefits of adhesives with the advantages of welding can in many applications lead to a superior assembly. However, using adhesives along a metal interface to be welded requires that the adhesive be weldable and thus electrically conductive.

Therefore, weldable adhesives have been developed which include electrically conductive filler dispersed throughout an adhesive matrix. Examples of weldable adhesives include those described in U.S. Pat. Nos. 4,353,951; 6,641,923; 7,147,897; and 8,796,580.

Although weldable adhesives find wide application such as in vehicle assembly in which sheeted steel panels are welded together, the resulting assemblies typically receive additional treatments and/or processing. For example, many welded vehicle components receive noise damping coatings that serve to reduce road noise and/or vibration when the component is assembled in a vehicle. Such noise damping coatings are typically applied by spraying onto the component, or by immersing the component in a bath of the composition. Such processes require additional capital investment for equipment and increase overall production time. In certain applications, even after application of a noise damping composition, the coated or sprayed vehicle component(s) do not sufficiently reduce noise or vibration. Accordingly, it would be beneficial to provide assemblies of welded components that included noise or vibration damping regions and which in certain applications could eliminate the need for additional application of noise reducing compositions.

SUMMARY

The difficulties and drawbacks associated with previous approaches are addressed in the present subject matter as follows.

In one aspect, the present subject matter provides a weldable and vibration damping adhesive composition comprising a silicone-based adhesive matrix. The adhesive composition also comprises electrically conductive or metallic particulates dispersed in the matrix. The adhesive composition further comprises a crosslinker. The adhesive composition exhibits either a symmetric or asymmetric peak composite loss factor greater than 0.10 at a frequency of 50 Hz and greater than 0.05 at a frequency of 8000 Hz.

In another aspect, the present subject matter provides a tape product comprising at least one release substrate, such as a release liner, and a weldable and at least one vibration damping adhesive composition disposed on the release liner. The adhesive composition includes a silicone-based adhesive matrix, electrically conductive or metallic particulates dispersed in the matrix, and a crosslinker.

In another aspect, the adhesive composition of the tape product exhibits a composite loss factor greater than 0.10 at a frequency of at least 50 Hz and a temperature less than 50° C.

In yet another aspect, the present subject matter provides a method of damping vibration of a workpiece. The method comprises providing a workpiece or substrate. The method also comprises providing an adhesive composition including a silicone-based adhesive matrix and electrically conductive or metallic particulates dispersed in the matrix, whereby the adhesive is applied to a workpiece or substrate. The method additionally comprises adhering the workpiece or substrate to a second workpiece or a substrate by contacting the adhesive between the first workpiece or substrate and the second workpiece or substrate. Vibration transmitted to the workpiece from the second workpiece or substrate is dampened by the adhesive. Multiple layers of adhesive and/or substrate may be applied together to generate a vibration damping workpiece. Not all adhesive layers are required to be weldable to generate the workpiece. In addition, not all adhesive layers are required to be capable of damping vibration.

In still another aspect, the present subject matter provides a vibration damping assembly comprising a workpiece or a substrate, an adhesive including a silicone-based adhesive matrix and metallic or electrically conductive particulates dispersed in the matrix, and a second workpiece or a substrate. The adhesive is disposed between and contacts the workpiece or substrate and the second workpiece or substrate, and upon vibration of the second workpiece or substrate, the vibration is dampened by the adhesive.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

Figure 1:
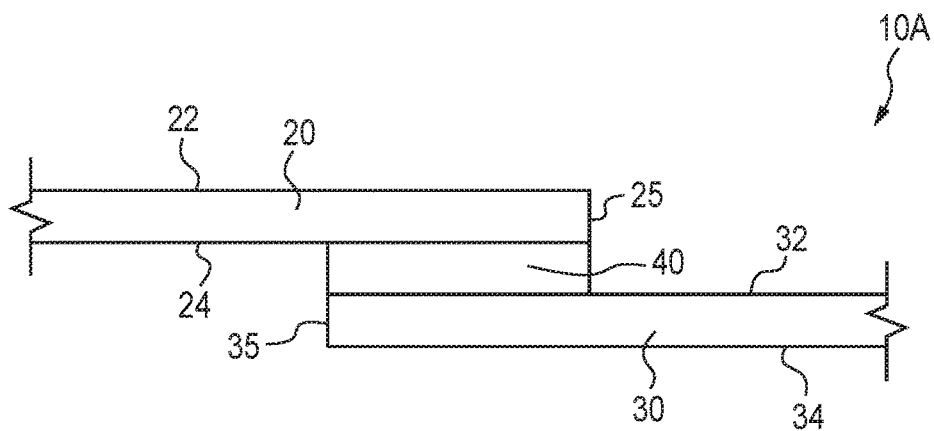
FIG. 1 is a schematic view of an assembly of metal substrates and an adhesive layer disposed between the substrates, in accordance with the present subject matter.

The present subject matter provides pressure sensitive adhesive (PSA, also referred to herein as adhesive) compositions that when used in an assembly dampen vibration and noise, and which are weldable. Using amounts of the adhesives between adjacent metal components to be welded serves to secure and bond the components together prior to, during, and after welding. Use of the adhesives serves to dampen vibration and noise to which the assembly of components may be exposed. The present subject matter also provides tape articles including the adhesives. The tapes can include one, two, or more layers or regions of the adhesives. At least one layer or region of adhesive must be weldable. The present subject matter also provides assemblies of metal components joined to one another by the adhesives. The assemblies can be welded or free from welds. The assembly can contain multiple layers of adhesives and/or substrates. The present subject matter also provides methods of reducing vibration and noise in a welded metal assembly by use of the adhesives. These and other aspects are described herein as follows.

Adhesive Compositions

The adhesives compositions of the present subject matter generally comprise (i) metallic or metallic containing particulates dispersed in (ii) a silicone-based PSA matrix. The adhesive composition can be further comprised of a crosslinker. Any adhesives known in the art can be used. In one embodiment, the adhesives can be solventless or nearly solventless.

Single or multiple layers of adhesive can be used. Different layers of adhesives that may or may not contain particles or have a different concentration of particles in the layers or have different types of particles.

Metallic Particulates

A wide array of particles or particulates can be used in the present subject matter adhesives. In one embodiment, the particles are metallic particulates. In another embodiment, the particles are electrically conductive.

Metallic particulates can be used in the adhesives, for example, metal powders such as aluminum, copper or special steel, molybdenum disulphide, iron oxide, e.g., black iron oxide, antimony-doped titanium dioxide and nickel doped titanium dioxide. Metal alloy particulates can also be used.

Also useful are particles coated with metals or metal alloys such as cobalt, copper, nickel, iron, tin, zinc, and combinations of thereof. Suitable particles which can be coated with the noted metals include but are not limited to alumina, aluminum, aromatic polyester, boron nitride, chromium, graphite, iron, molydenum, neodymium/iron/boron, samarium cobalt, silicon carbide, stainless steel, titanium diboride, tungsten, tungsten carbide, and zirconia particles. Such metal-coated particles are commercially available from Advanced Ceramics Corp. and a variety of other suppliers. Mixtures of different particulates can be used.

Other metal-coated or metal-containing particles which may be used in the various adhesives of the present subject matter include but is not limited to ceramic microballoons, silica particulates, chopped glass fibers, graphite powder and flake, carbon black, boron nitride, mica flake, copper powder and flake, nickel powder and flake, aluminum coated with metals such as carbon, copper, nickel, palladium, silver and titanium coatings. These particles are typically metal-coated using fluidized bed chemical vacuum deposition techniques. Such metal-coated particles are commercially available from Powdermet, Inc. and various other suppliers. Mixtures of different particulates can be used.

In certain embodiments of the present subject matter, the particulates can be selected from at least one of ferrophosphorous, zinc, tungsten and mixtures thereof.

Suitable zinc pigments are commercially available from Zincoli GmbH under the designation ZINCOLIS® 620 or 520. Suitable iron phosphide pigments, also referred to as ferrophosphorus, are commercially available from Occidental Chemical Corporation under the designation FERROPHOS™.

The adhesives of the current invention can have particles of varying sizes. Particles of any type, size, shape distribution, etc. can be used, as long as when used in the adhesive the welding and damping criteria are met. In one embodiment the particles are less than 100 microns in size. In particular embodiments, the adhesives of the present subject matter include aluminum powder in which a majority proportion of the aluminum particulates e.g., at least 80%, in certain versions at least 85%, and in still other certain versions at least 90%, which has a particle size less than 45 microns. These particle sizes and size distributions are determined in accordance with DIN 53195. Nonlimiting examples of such iron powders which are commercially available include iron powders SIPCM commercially available from BASF and W100.25 commercially available from Högenäs GmbH, FE-M-02-PTCS commercially available from American Elements, and iron alloy FerAlloy Ni2 commercially available from Pometon Powder. Nonlimiting examples of such aluminum powders which are commercially available include RO 400, RO 500, and RO 550 from Eckart GmbH of Fuerth, Germany, and Eckart America of Louisville, Ky. Nonlimiting examples of such silver powders which are commercially available include 15ED or 85HV from Ferro Corporation. Table 1 summarizes the size characteristics and properties of some of these particles.

TABLE 1

Commercially Available Particles for Use in the Adhesives

Screen Analysis/Wet Sieving
with Water as Rinsing Liquid
According to DIN 53195

| Particle Types | <71 microns (%) | <45 microns (%) | Active Metal Content (%) | Typical Surface Area (cm²/g) |
|---|---|---|---|---|
| SIPCM | | >99 | >99 | |
| RO 400 | ≥98 | ≥90 | ≥92 | 22,000 |
| RO 500 | ≥99 | ≥94 | ≥91 | 27,000 |
| RO 550 | ≥99 | ≥96 | ≥90 | 30,000 |
| 15ED | | >95 | >98 | 9500 |
| W100.25 | 43 | 20 | >99 | na |

These particles are available in powder form, and in paste forms.

The particulates are dispersed in the adhesive matrix in an amount such that the resulting adhesive composition after curing and subsequent deposition on a substrate is weldable. The term "weldable" is defined herein as the particles can be sufficiently joined to sustain a spot welding and joining operation as used in an assembly plant, such as an automotive plant. Typically, the weight percentage of the particulates in the adhesive matrix is within a range of 0.2% to 10.0%, more particularly within a range of 0.2% to 5.0%, and typically about 1-2% based upon a dry weight of the adhesive.

Adhesive Matrix

The adhesive compositions of the present subject matter comprise a silicone-based PSA matrix. Silicone-based PSA's are well described in the art, such as U.S. Pat. Nos. 4,584,355; 5,726,256; 5,869,556; 2012/0172543; and European patent 1,957,597, for example. One type of silicone PSA is commonly prepared by a bodying reaction between reactive polyorganosiloxane polymers (sometimes referred to as a gum) and reactive polyorganosiloxane resin(s).

"Bodying" means reacting a polymer and resin to increase molecular weight, crosslinking, or both. Inert solvents, silicone fluids, catalysts, fillers, stabilizers, and other additives may also be present.

Silicone PSA's may be crosslinked via addition mechanism using silicon-hydride crosslinkers unsaturated polyorganosiloxane polymers and a suitable catalyst for hydrosilylation, such as platinum, iron, or copper. Alternatively, silicone PSA's may be free-radical crosslinked using, for example, a peroxide crosslinker, such as benzoyl peroxide through hydrogen abstraction and creation of ethylene linkages. Blends of silicone PSA's may also be used for the present subject matter. In general, the PSA compositions may include components with a diverse range of structures, molecular weights, reactive functions and viscosities.

In one embodiment, the silicone-based adhesive matrix includes (i) a silicone adhesive, and (ii) one or more of a silicone gum, MQ resin, and another silicone adhesive. In one embodiment, (ii) is a silicone gum and the weight ratio of (i) to (ii) is within a range of from 100:0 to 40:60, between 95:5 to 55:45, or between 90:10 to 70:30.

In another embodiment, the silicone based adhesive matrix includes (i) a silicone adhesive and (ii) a MQ resin and the weight ratio of the silicone adhesive to MQ resin is within a range of from 100:0 to 60:40 or between 95:5 to 80:20.

In another embodiment, the silicone based adhesive matrix includes (i) a silicone adhesive and (ii) another silicone adhesive and the weight ratio of (i) to (ii) is within a range of from 100:0 to 0:100 or between 100:0 to 50:50.

In one embodiment, at least one of the silicone adhesives includes a) a polyorganosiloxane gum, with in-chain and/or end-chain vinyl functionality and b) a MQ resin. In another embodiment, the silicone adhesives includes a) one or more of a polydimethylsiloxane gum, polymethylphenyl siloxane gum, copolymers of polydimethyl and polymethylphenyl siloxane gum, or copolymers of polydimethyl and polydiphenyl siloxane gum and b) a MQ resin. In one embodiment, the MQ resin contains reactive silanol and/or vinyl functionality, in another it has no reactive functionality.

The PSA's may include polyorganosiloxane dispersions with a repeat formula of $R^1_2SiO_{2/2}$ or $R^1R^2SiO_{2/2}$, such as polydimethylsiloxanes, polydimethyl/methylvinyl siloxanes, polydimethyl/methylphenyl siloxanes, polydimethyl/diphenyl siloxanes, and blends thereof and silicone resins, such as MQ resins or blends of resins. Examples of M units in the resin may include but is not limited to $Me_3SiO_{1/2}$, $Me_2ViSiO_{1/2}$, $Me_2PhSiO_{1/2}$, $Ph_2MeSiO_{1/2}$, $MeVi_2SiO_{1/2}$, $HOMe_2SiO_{1/2}$, $(HO)_2MeSiO_{1/2}$, $Me_2HSiO_{1/2}$, $Me_2H_2SiO_{1/2}$, where Me=methyl, OH=hydroxyl, Vi=vinyl, and Ph=phenyl. Q units can be defined as $SiO_{4/2}$. $R^1$ or $R^2$ may be any monovalent organic, or hydroxyl group or hydrogen. One skilled in the art would recognize that any polyorganosiloxane resins bodied or dispersed with the polyorganosiloxane polymers mentioned, to give a silicone adhesive with PSA properties, would be fitting with the present subject matter. Non-limiting examples of such PSA compositions which are commercially available include adhesives, 7651, 7652, 7657, Q2-7406, Q2-7566, Q2-7735 and 7956, all available from Dow Corning, SilGrip™ PSA518, 590, 595, 610, 915, 950 and 6574 available from Momentive Performance Materials, and KRT-009 and KRT-026 available from Shin-Etsu Silicone. However, when applied in an assembly as describe herein, the adhesive must provide the damping performance described.

The PSA may additionally include performance modifiers, such as polyorganosiloxane polymers (either reactive or non-reactive), reactive fluids, or resins (either reactive or non-reactive) for damping, glass transition, modulus, adhesion, tack, viscosity or other property modification. Non-limiting examples of such modifiers which are commercially available include Syl-Off® 7075, 2-1912, 2-7066, 2-7466 all available from Dow Corning, SR545 and SR9130 available from Momentive Performance Materials and KRT-974 from Shin-Etsu Silicone.

The present subject matter adhesives include blends of adhesives that utilize particular weight ratios of peroxide-curable PSA with hydrosilation catalyzed PSA where the silicon-hydride crosslinker and hydrosilation catalyst are not used. Generally, the weight ratios of these components can be from about 50:50 to about 100:0, respectively. Weight ratios greater than 80:20, such as 90:10 or 95:5 for example are particularly suitable for the invention. However, it will be understood that the present subject matter is not limited to any of these specific weight ratios, and includes ratios less than 50:50 such as 40:60.

The PSA may include one or more crosslinkers which serve to form crosslinks in the silicone-based matrix. For many embodiments, a peroxide crosslinker, such as dibenzoylperoxide, is suitable. In one embodiment, the crosslinker is a compound that contains silicon-hydride functionality. Non-limiting examples of such crosslinkers include PEROXAN BP 50W, PEROXAN BIC, and PEROXAN Bu, all available from Pergan of Bocholt, Germany, and Luperox A75 and A98 commercially available from Arkema, and Perkadox CH-50 and PD 50SPS from Akzo Nobel. Cross-linking can be facilitated and/or promoted by heating or other techniques generally depending upon the chemical system employed.

Different amounts of crosslinker may be added to the adhesive composition of the present invention. In some embodiments, a minimum level of crosslinker is required in order to meet the desired composite loss factor. The level of crosslinker is also dependent on the thickness of the adhesive in the embodiment. In some embodiments the crosslinker level is from 0.5-10%. The crosslinker level may be from 0.5-4%.

Other materials in addition to the components may be included in the adhesives. These include but not limited to antioxidants, fillers, pigments, reinforcing agents, etc. The adhesives may contain a blend of additives.

The adhesive matrix can also comprise one or more solvents. A wide variety of solvents can be used so long as the solvent(s) are compatible with the other components in the adhesive composition. Nonlimiting examples of suitable solvents include toluene, xylene, and combinations thereof. However, it will be appreciated that the present subject matter adhesives are not limited to such solvents and may utilize a wide array of other solvents, additives, and/or viscosity adjusting agents, such as reactive diluents.

In many embodiments of the present subject matter, the adhesives are pressure sensitive adhesives. A description of useful pressure sensitive adhesives and their characteristics may be found in *Encyclopedia of Polymer Science and Engineering*, Vol. 13. Wiley-Interscience Publishers (New York, 1988). Additional description of useful pressure sensitive adhesives may be found in *Encyclopedia of Polymer Science and Technology*, Vol. 1, Interscience Publishers (New York, 1964).

Vibration Damping

A significant aspect of the present subject matter adhesives is their ability to provide vibration damping characteristics when used in an assembly, and particularly their combination of vibration damping characteristics and being weldable.

The material loss factor is an indication of the vibration (and sound) damping properties of a material. The composite loss factor (CLF) is a measure of the conversion of vibrational energy to thermal energy. A conventional high damping material composition is generally required to have a material loss factor of not less than 0.8. In a constraint layer construction, the total composite loss factor, including the constraint layer substrates and the visco-elastic damping material, is generally required to be not less than 0.1.

The adhesives of the present subject matter when used in an assembly typically exhibit a peak composite loss factor greater than 0.1. In a particular embodiment, the adhesives exhibit (i) a composite loss factor greater than 0.10 at 50 Hz, and/or (ii) a composite loss factor greater than 0.05 at a frequency of 8000 Hz. Determination of composite loss factors is described in ASTM E 756-98, "Standard Test Method for Measuring Vibration-Damping Properties of Materials."

Tape Products

The present subject matter also provides various tape products. The tapes include one or more, such as two, layers of the previously noted adhesives disposed on a substrate or liner. The tapes can include one or more release liners disposed on and covering an otherwise exposed adhesive layer. The tapes can be provided in a flat strip or sheet form, or alternatively in a rolled or wound form.

In many embodiments, the tapes are transfer tapes having a single layer of adhesive disposed on a release liner. The adhesive layer is contacted with a workpiece or substrate, and then the release liner is removed or separated from the adhesive layer. The exposed face of the adhesive layer can then be contacted with another workpiece and/or substrate. The present subject matter also includes tapes and tape products in which the release liner is not removed.

The tape products can also include multiple layers of adhesive. In one embodiment the tape product has at least two layers of adhesive, at least one on each opposing side of the substrate. In another embodiment, the tape product has at least two layers of adhesive composition and the at least two layers are on the same side of the substrate. Multiple layers of adhesive composition can be on each side or just one side of the substrate.

Substrates

The present subject matter tape products can utilize a wide range of substrates. The substrate that can be selected can be any sheet or film substrate intended for use in a transfer tape operation. These substrates include metal rolls, metal sheets, metal foils, polymer films, paper, and combinations thereof. In some instances the substrate is referred to as a workpiece. The substrates can be single layered sheets or films or they can be multilayered constructions. These include polymeric films and multilayered polymeric films. The multilayered constructions and polymeric films have two or more layers. The layers of multilayered constructions and polymeric films can have the same composition and/or size or they can be different. The substrate can be any of the above sheet or film materials, and in addition the substrate can include a workpiece or release liner of such a material, in combination with other layers. The substrate can have any thickness that is suitable for roll, sheet or film substrates intended for use in transfer tape operations or workpieces in assembly operations. Typical thicknesses are in the range of 0.3 to about 20 mils.

The metal foils include foils of such metals as copper, gold, silver, tin, chromium, zinc, nickel, platinum, palladium, iron, aluminum, steel, lead, brass, bronze, and alloys of the foregoing metals. Examples of such alloys include copper/zinc, copper/silver, copper/tin/zinc, copper/phosphorus, chromium/molybdenum, nickel/chromium, nickel/phosphorous, and the like. The metal foils can be joined or adhered to a polymeric sheet or film to form a multilayered laminate or construction. Examples of the polymer sheets and films that can be joined to these metal foils include but not limited to polyimide and polyester sheets and films.

The polymer films include polyolefins (linear or branched), polyamides, polystyrenes, polyimides, polyesters, polyester copolymers, polyurethanes, polysulfones, polyvinylidine chloride, styrene-maleic anhydride copolymers, styrene-acrylonitrile copolymers, ionomers based on sodium or zinc salts of ethylene methacrylic acid, polymethyl methacrylates, cellulosics, fluoroplastics, acrylic polymers and copolymers, polycarbonates, polyacrylonitriles, and ethylene-vinyl acetate copolymers. Included in this group are the acrylates such as ethylene methacrylic acid, ethylene methyl acrylate, ethylene acrylic acid and ethylene ethyl acrylate. Also included in this group are polymers and copolymers of olefin monomers having, for example, 2 to about 12 carbon atoms, and in another embodiment, 2 to about 8 carbon atoms. These include the polymers of alpha-olefins having from 2 to about 4 carbon atoms per molecule. These include polyethylene, polypropylene, poly-1-butene, and copolymers thereof. An example of such a copolymer is a copolymer of ethylene with 1-butene having from about 1 to about 10 weight percent of the 1-butene comonomer incorporated into the copolymer molecule. The polyethylenes that are useful have various densities including low, medium and high density ranges. Films prepared from blends of copolymers or blends of copolymers with homopolymers are also useful. The films may be extruded as monolayered films or multilayered films.

The paper substrates include paper, clay coated paper, glassine, paperboard from straw, bark, wood, cotton, flax, cornstalks, sugarcane, bagasse, bamboo, hemp, and similar cellulose materials prepared by such processes as the soda, sulfite or sulfate (Kraft) processes, the neutral sulfide cooking process, alkali-chlorine processes, nitric acid processes, semi-chemical processes, etc. Although paper of any basis weight can be employed, paper having basis weights in the range of from about 20 to about 150 pounds per ream (lb/ream) are useful.

The substrate can be a polymer coated paper or film which is basically comprised of a sheet of paper or film that is coated or adhered on either one or both sides with a polymer coating. The polymer coating, which can be comprised of a high, medium, or low density polyethylene, polypropylene, polyester, and other similar polymer films, is coated or adhered onto the substrate surface to add strength and/or dimensional stability. The weight of these types of coated paper substrates can vary over a wide range with weights in the range of about 20 to about 150 lb/ream being useful. The thickness of these types of coated film substrates can vary over a wide range with thicknesses typically in the range of about 1.5 mils to 6 mils.

Release Liners

The various tape products of the present subject matter can optionally include one or more release liners or release liner assemblies. Release liners are widely available from various commercial suppliers. In many embodiments, if a release liner is used, the release liner includes a coating of a release agent which can be for example a silicone-based release agent such as a polyorganosiloxane or a fluorine-modified polyorganosiloxane, fluorosilicone, blends or co-polymers thereof. Alternatively, release liners may be used without release agents, as long as the adhesive releases from the release liner. Any of the above mentioned substrates and substrate combinations can be used as a release liner. One such example includes polyester film coated with a polyolefin layer on one side and fluorosilicone release agent on the opposite side.

Adhesive Layer(s)

The various tape products include one or more layers or regions of silicone adhesive(s) as described herein.

The thickness of the silicone adhesive is typically from about 5 microns to about 150 microns, and in certain embodiments about 100 microns. However, it will be appreciated that the present subject matter includes tape products having adhesive layer thicknesses greater than or less than these values. The tape product can be provided in several forms such as a single release liner (double side release capable), using two release liners (at least single sided release capable each liner).

Methods

The present subject matter also provides various methods of reducing vibration and noise in an assembly, and particularly in a welded assembly of metal workpieces. In one embodiment, a method is provided which comprises providing a workpiece or a substrate. The workpiece is metal or at least includes metallic portions or regions. Nonlimiting examples of such workpieces include automobile or vehicle components such as body panels, structural components, and frame members. The method also comprises providing one or more adhesives as described herein. The adhesives generally comprise a silicone-based adhesive matrix and metallic or electrically conductive particulates dispersed in the matrix. The method also comprises adhering the workpiece or substrate to another workpiece and/or to a substrate. This adhering operation is typically performed by depositing the adhesive on a desired region(s) of one or both workpieces or substrates, and then contacting the components together. Upon appropriately positioning the components together, the adhesive disposed along at least portions of the interface between adjoining component surfaces, forms an adhesive bond. The resulting assembly can also be welded such as by welding along all or a portion of the noted interfaces.

In many applications, the present subject matter is used with resistive spot welding processes (also known as "spot welding" or RSW). Variations of spot welding are also contemplated such as projection welding. The present subject matter can be used in conjunction with a wide array of welding processes and techniques including, but not limited to, shielded metal arc welding (SMAW) (also known as "stick welding"), gas tungsten arc welding (GTAW) (also known as "TIG"), gas metal arc welding (GMAW) (also known as "MIG"), flux-cored arc welding (FCAW), submerged arc welding (SAW), and electroslag welding (ESW). Although the present subject matter typically is used with welding processes, it will be understood that the present subject matter assemblies and methods do not require welding and thus, can be "welding-free" or "weld-free." Thus, the adhesives of the present subject matter serve to dampen vibration in an assembly prior to, during, and after welding; and in assemblies which are not welded.

Assemblies

The present subject matter also provides various vibration damping assemblies. Generally, such assemblies comprise a workpiece or substrate, an adhesive including a silicone-based adhesive matrix, and metallic particulates dispersed in the matrix, and a second workpiece or a substrate. The adhesive is disposed between and contacts the workpiece or substrate and the second workpiece or substrate, and upon vibration of the second workpiece or substrate, the vibration is dampened by the adhesive. The assembly can be symmetric or asymmetric meaning that the substrate or workpiece can be the same on both sides of the adhesive layer or can differ.

Embodiments

FIG. 1 is a schematic view of a bonded assembly 10A in accordance with the present subject matter. The bonded assembly 10A comprises a first substrate 20 defining oppositely directed sides 22 and 24, and an edge 25 extending therebetween. The bonded assembly 10A also comprises a second substrate 30 defining oppositely directed sides 32 and 34, and an edge 35 extending therebetween. The bonded assembly 10A also comprises a layer or amount of adhesive 40 disposed between the substrates 20, 30, and particularly between a side 24 of the first substrate 20 and a side 32 of the second substrate 30. The layer or region of adhesive 40 is disposed along a peripheral edge region on each substrate 20, 30.

Figure 2:
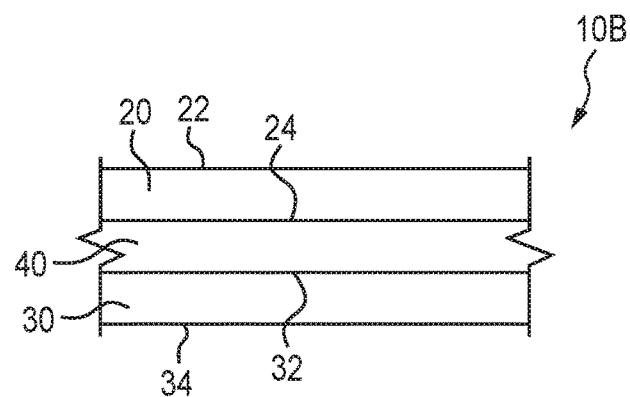
FIG. 2 is a schematic view of another assembly of metal substrates and an adhesive layer disposed between the substrates, in accordance with the present subject matter.

FIG. 2 is a schematic view of a bonded assembly 10B in accordance with the present subject matter. The bonded assembly 10B comprises a first substrate 20 defining oppositely directed sides 22 and 24. The bonded assembly 10B also comprises a second substrate 30 defining oppositely directed sides 32 and 34. The bonded assembly 10B also comprises a layer or amount of adhesive 40 disposed between the substrates 20, 30, and particularly between a side 24 of the first substrate 20 and a side 32 of the second substrate 30. The layer or region of adhesive 40 extends along a majority portion, or substantially all of, each face of each substrate 20, 30.

Figure 3:
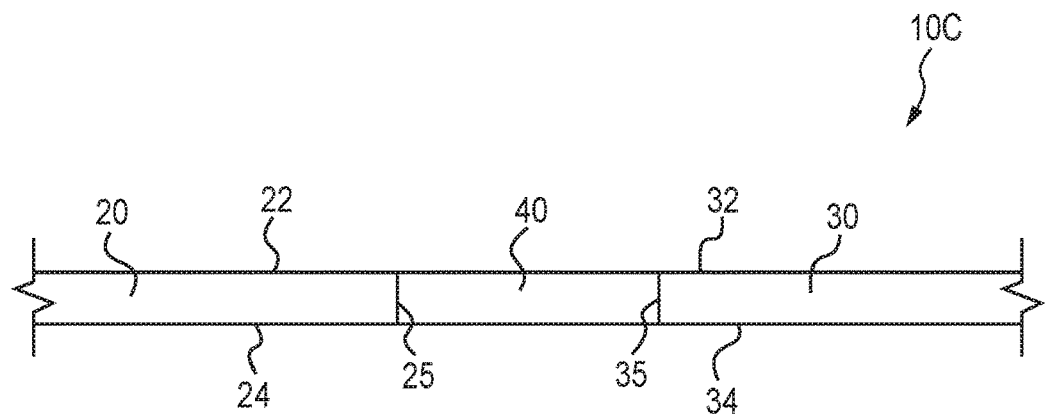
FIG. 3 is a schematic view of yet another assembly of metal substrates and an adhesive layer disposed between the substrates in accordance with the present subject matter.

FIG. 3 is a schematic view of a bonded assembly 10C in accordance with the present subject matter. The bonded assembly 10C comprises a first substrate 20 defining oppositely directed sides 22 and 24, and an edge 25 extending therebetween. The bonded assembly 10C also comprises a second substrate 30 defining oppositely directed sides 32 and 34, and an edge 35 extending therebetween. The bonded assembly 10C also comprises a layer or amount of adhesive 40 disposed between the substrates 20, 30, and particularly between an edge 25 of the first substrate 20 and an edge 35 of the second substrate 30.

Figure 4A:
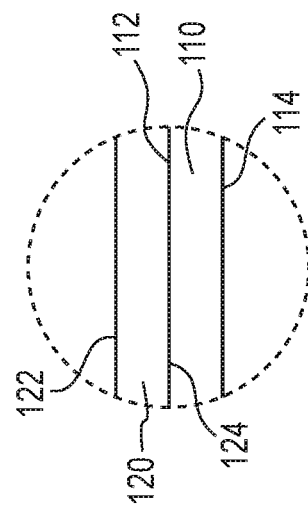
FIG. 4A is a schematic side view of the tape of FIG. 4.
Figure 4:
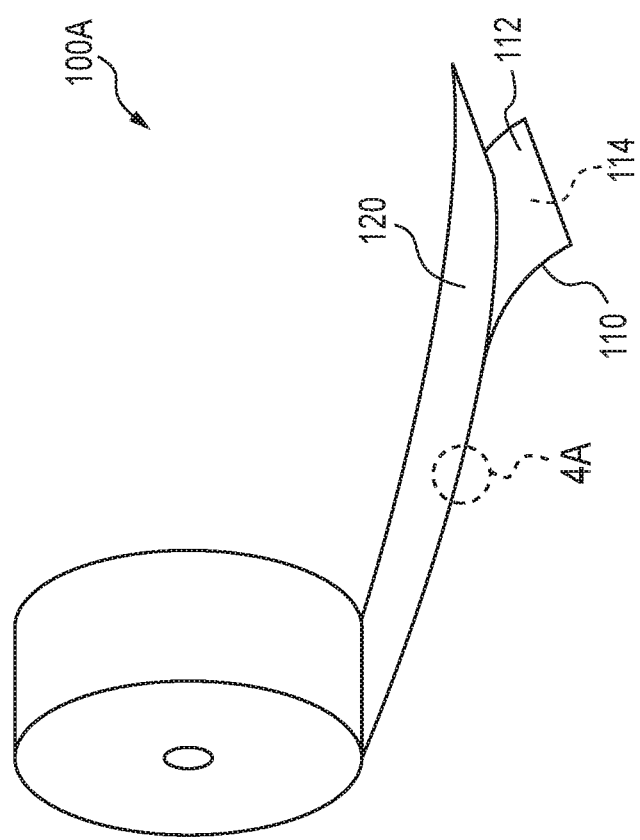
FIG. 4 is a schematic view of a tape product including a layer of the adhesive in accordance with the present subject matter.

FIGS. 4 and 4A are schematic illustrations of a tape product 100A in accordance with the present subject matter. The tape 100A comprises a release liner 110 defining oppositely directed faces 112 and 114. The tape 100A also comprises an adhesive layer 120 disposed on the release liner 110 and particularly upon the face 112 of the liner or substrate 110. The adhesive layer 120 defines oppositely directed faces 122, 124. The tape 100A may optionally comprise a release liner (not shown) disposed on and covering the adhesive layer 120 and particularly the face 122 of the adhesive layer 120.

Figure 5A:
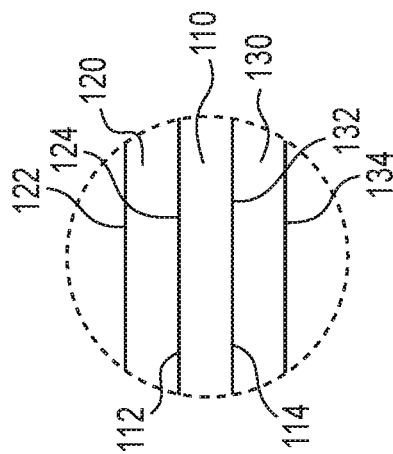
FIG. 5A is a schematic side view of the tape of FIG. 5.
Figure 5:
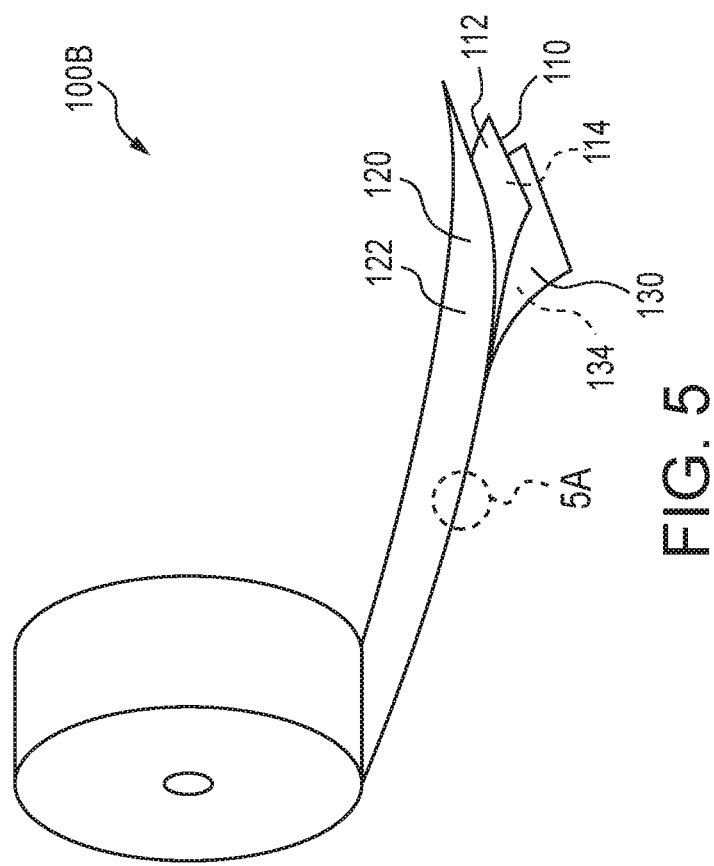
FIG. 5 is a schematic view of another tape product including two layers of the adhesive in accordance with the present subject matter.

FIGS. 5 and 5A are schematic illustrations of another tape product 100B in accordance with the present subject matter. The tape 100B comprises a release liner 110 defining oppositely directed faces 112 and 114. The tape 100B also comprises a first adhesive layer 120 disposed on the release liner 110 and particularly upon the face 112 of the release liner 110. The first adhesive layer 120 defines oppositely directed faces 122, 124. The tape 100B also comprises a second adhesive layer 130 disposed on the backing and particularly upon the face 114 of the release liner 110. The second adhesive layer 130 defines oppositely directed faces 132, 134.

Examples

Preparation of Adhesives

Samples of a weldable and vibration damping adhesive in accordance with the present subject matter were prepared as follows, as summarized in Table 6.

TABLE 2

| Adhesive Formulation example 1 | |
|---|---|
| Components | Weight (kg) |
| Dow Corning Q2-7735 | 102.0 |
| Dow Corning 7651 | 60.0 |
| ALUPOR RO500 | 0.9 |
| PEROXAN BP 50W | 3.2 |
| Toluene | As Needed |

Preparation of Part A comprises blending the silicone PSA components noted in Table 6 in a mixing vessel with solvent. The solvent was added as necessary to control viscosity within a target range for typical adhesive coating methods. Part B comprises adding the metal paste to Part A slowly while mixing. In a separate vessel, Part C comprises a premix solution of peroxide crosslinker and solvent in a concentration to completely dissolve the crosslinker. Part C was then added in 4 separate aliquots to Part B, while mixing.

After mixing the above noted adhesive formulation, the adhesive is coated onto a release liner or substrate. Any conventional adhesive coating equipment and processes can be used. The adhesive on release liner or substrate is then heated to facilitate solvent removal crosslinking or curing. A cure of 1 minute at 66° C. (150° F.) for solvent removal, followed by 2 minutes at 177 to 204° C. (350 to 400° F.) is typical for adhesives that contains benzoyl peroxide. Hence, heating often occurs in a temperature multizoned oven or multiple ovens at different temperatures. If equipment and type of release liner or substrate material permit the use of higher curing temperatures, the cure time may be shortened.

Other examples: Tables 3-5, Results see FIG. 6 Example 2 to 4 are prepared, coated and cross linked similar to example 1.

TABLE 3

| Adhesive Formulation example 2 | |
|---|---|
| Components | Weight (kg) |
| Dow Corning Q2-7735 | 72.8 |
| Dow Corning 7651 | 100.1 |
| ALUPOR RO500 | 0.9 |
| PEROXAN BP 50W | 3.2 |
| Toluene | As Needed |

TABLE 4

| Adhesive Formulation example 3 | |
|---|---|
| Components | Weight (kg) |
| Dow Corning Q2-7735 | 117.0 |
| Dow Corning 7651 | 40.1 |

TABLE 4-continued

Adhesive Formulation example 3

| Components | Weight (kg) |
|---|---|
| ALUPOR RO500 | 0.9 |
| PEROXAN BP 50W | 3.2 |
| Toluene | As Needed |

TABLE 5

Adhesive Formulation example 4

| Components | Weight (kg) |
|---|---|
| Dow Corning Q2-7735 | 146.0 |
| Dow Corning 7651 | 0 |
| ALUPOR RO500 | 0.9 |
| PEROXAN BP 50W | 3.2 |
| Toluene | As Needed |

The tape is transferred to the substrate or workpiece. In order to measure the vibration damping results a symmetric or asymmetric assembly is made.

Determination of composite loss factors is described in ASTM E 756-98, "Standard Test Method for Measuring Vibration-Damping Properties of Materials."

Vibration Testing

Various samples of steel sheets having a thickness of 3 mm were adhesively bonded together using a layer of an adhesive in accordance with the present subject matter. Bonded samples were formed in which the weight ratio of silicone components in the adhesive, i.e., the ratio of the base silicone to the silicone gum, varied from 50:50 to 100:0. Three adhesive samples in accordance with the present subject matter were prepared using ratios of 50:50, 70:30, and 80:20. A comparative sample was prepared using a ratio of 100:0. The bonded samples were then subjected to vibration damping testing in which the composite loss factor of each bonded sample was measured over a range of temperatures and upon application of a 50 Hz vibration. The vibration damping testing was performed in accordance with ASTM E 756-98.

Figure 6:
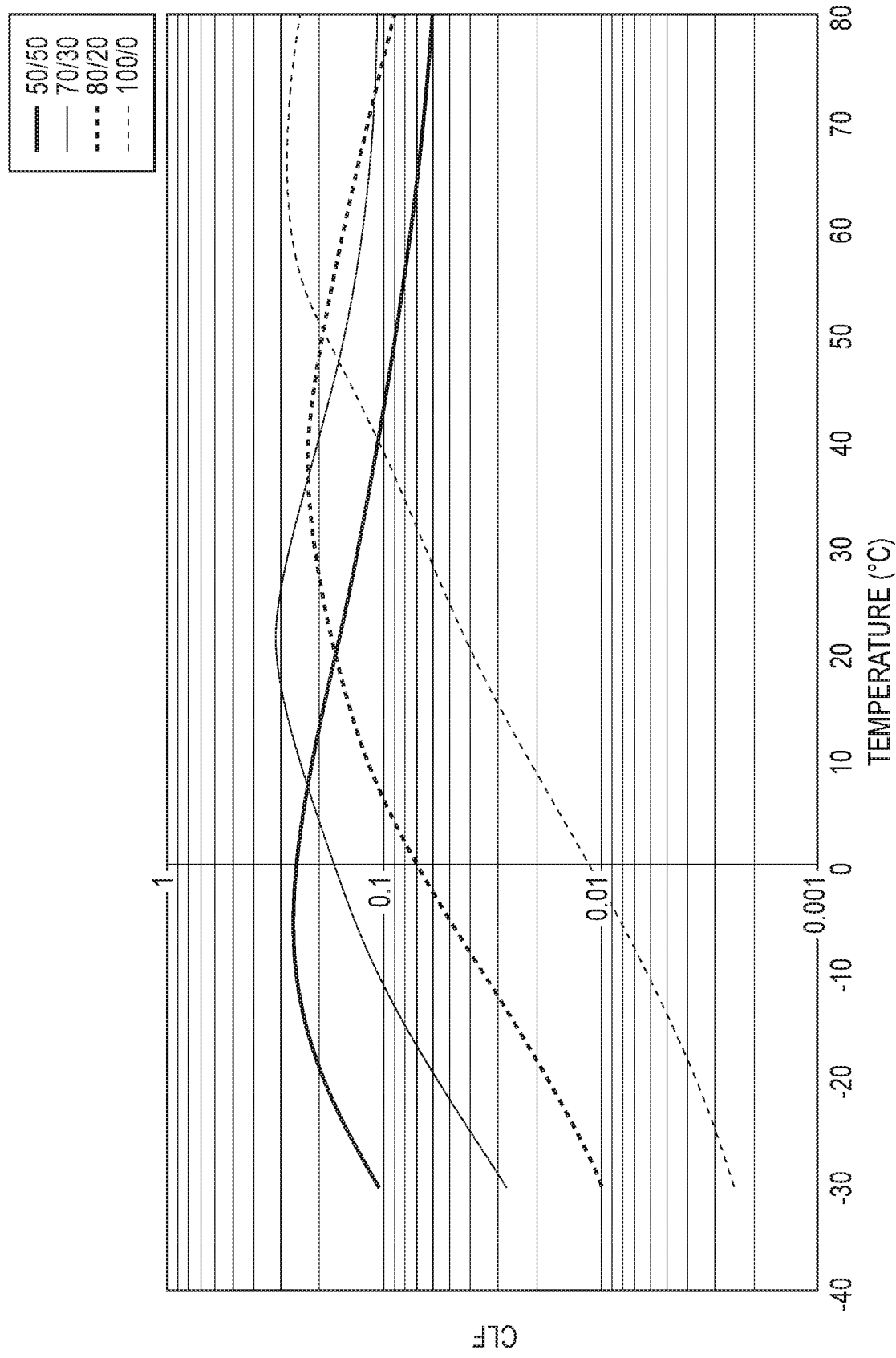
FIG. 6 is a graph of vibration testing results for various adhesive compositions used in an assembly in accordance with the present subject matter.

FIG. 6 is a graph illustrating the results from the noted vibration damping testing for examples 1-4. As evident in FIG. 6, upon application of 50 Hz vibration, adhesives in accordance with the present subject matter exhibit (i) a peak composite greater factor less than 0.10 at temperatures greater than 50° C., and (ii) a composite loss factor greater than 0.1 at temperatures less than 40° C.

Figure 7:
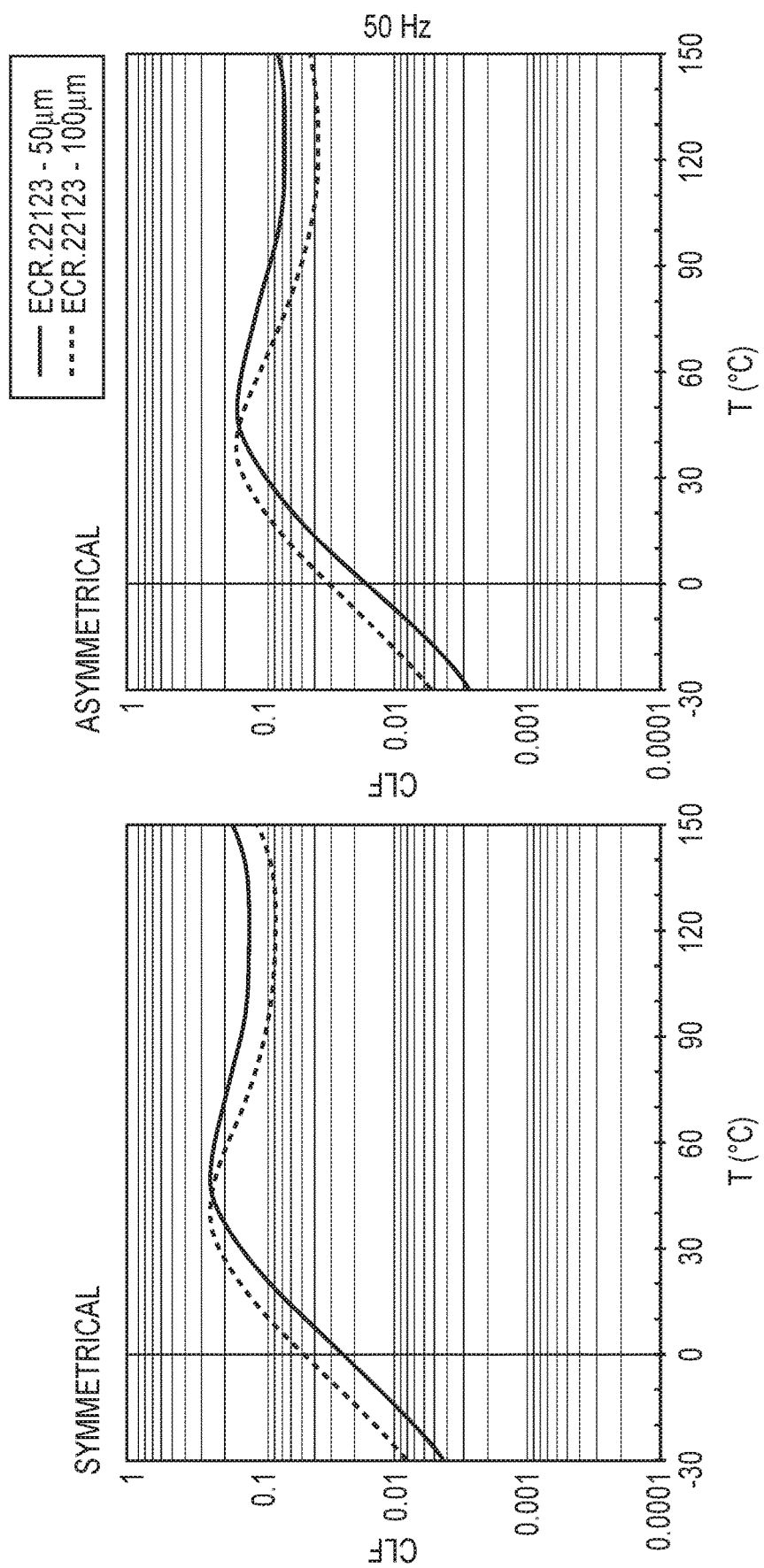
FIG. 7 is a graph of the damping plots for an adhesive used in an assembly, in accordance with the present subject matter at two different thicknesses at 50 Hz.

FIG. 7 shows the damping data for a formulation in accordance with the present subject matter at two different thicknesses at 50 Hz. Table 6 shows the raw data for the plots in FIG. 7.

TABLE 6

Raw data for FIG. 7 showing CLF data over a temperature range with the peak CLF in accordance with the subject matter.

| | Temperature | | | | | Peak CLF |
|---|---|---|---|---|---|---|
| | 0° C. | 20° C. | 40° C. | 60° C. | 80° C. | |
| ECR 22123 50 µm Symmetrisch | 2.73E−02 | 9.55E−02 | 2.32E−01 | 2.37E−01 | 1.74E−01 | 2.54E−01 |
| ECR 22123 100 µm Symmetrisch | 5.04E−02 | 1.56E−01 | 2.59E−01 | 1.81E−01 | 1.15E−01 | 2.59E−01 |
| ECR 22123 50 µm Asymmetrisch | 1.73E−02 | 6.13E−02 | 1.45E−01 | 1.47E−01 | 1.04E−01 | 1.60E−01 |
| ECR 22123 100 µm Asymmetrisch | 3.26E−02 | 1.00E−01 | 1.57E−01 | 1.07E−01 | 6.38E−02 | 1.58E−01 |

Figures 1, 8:
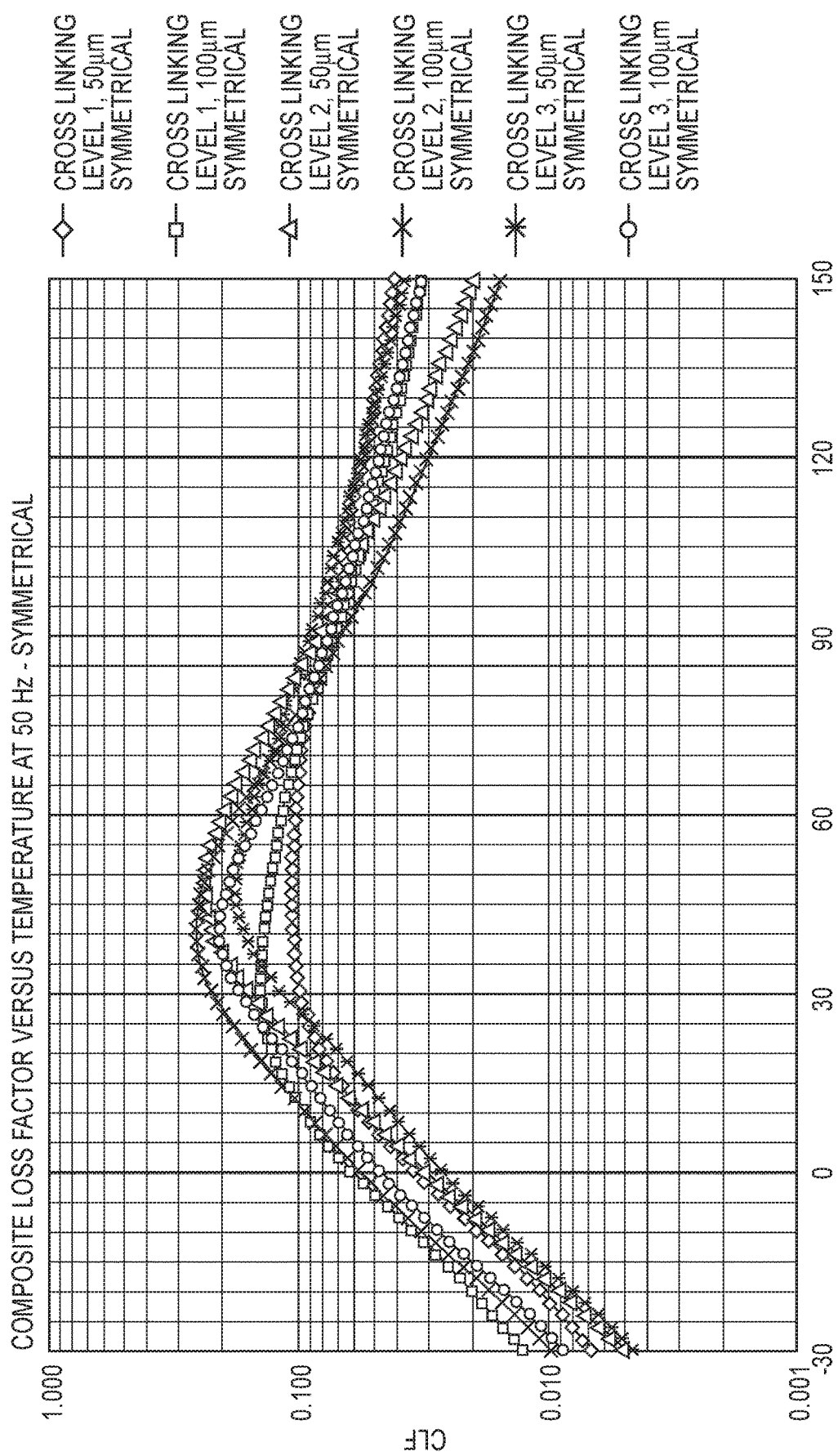
FIG. 8 is a graph of the damping plots for an adhesive in an assembly in accordance with the present subject matter showing composite loss factor (CLF) versus temperature (° C.) at 50 Hz. Data shows three different crosslinker levels and at two different thicknesses.

FIG. 8 is a graph of the damping plots for an adhesive in an assembly in accordance with the present subject matter showing composite loss factor (CLF) versus temperature (° C.) at 50 Hz. Data shows three different crosslinker levels and at two different thicknesses Table 7.

TABLE 7

Raw data for FIG. 8 showing the CLF data over a temperature range and peak CLF in accordance with the subject matter.

| | Temperature | | | | | Peak CLF |
|---|---|---|---|---|---|---|
| | 0° C. | 20° C. | 40° C. | 60° C. | 80° C. | |
| Cross linking level 1, 50 µm Symmetrical | 0.0346 | 0.0818 | 0.1050 | 0.1030 | 0.0898 | 0.1050 |
| Cross linking level 1, 100 µm Symmetrical | 0.0613 | 0.1280 | 0.1370 | 0.1150 | 0.0849 | 0.1410 |
| Cross linking level 2, 50 µm Symmetrical | 0.0323 | 0.0992 | 0.2240 | 0.2010 | 0.1110 | 0.2390 |
| Cross linking level 2, 100 µm Symmetrical | 0.0573 | 0.1570 | 0.2570 | 0.1730 | 0.0880 | 0.2570 |
| Cross linking level 3, 50 µm Symmetrical | 0.0268 | 0.0711 | 0.1690 | 0.1540 | 0.1040 | 0.1800 |
| Cross linking level 3, 100 µm Symmetrical | 0.0479 | 0.1170 | 0.2070 | 0.1410 | 0.0900 | 0.2070 |
| Cross linking level 1, 50 µm Asymmetrical | 0.0221 | 0.0541 | 0.0701 | 0.0687 | 0.0601 | 0.0706 |

TABLE 7-continued

Raw data for FIG. 8 showing the CLF data over a temperature range and peak CLF in accordance with the subject matter.

| | Temperature | | | | | Peak CLF |
|---|---|---|---|---|---|---|
| | 0° C. | 20° C. | 40° C. | 60° C. | 80° C. | |
| Cross linking level 1, 100 μm Asymmetrical | 0.0402 | 0.0855 | 0.0926 | 0.0763 | 0.0547 | 0.0950 |
| Cross linking level 2, 50 μm Asymmetrical | 0.0207 | 0.0629 | 0.1450 | 0.1390 | 0.0778 | 0.1600 |
| Cross linking level 2, 100 μm Asymmetrical | 0.0376 | 0.0991 | 0.1620 | 0.1140 | 0.0576 | 0.1620 |
| Cross linking level 3, 50 μm Asymmetrical | 0.0173 | 0.0450 | 0.1090 | 0.1050 | 0.0724 | 0.1200 |
| Cross linking level 3, 100 μm Asymmetrical | 0.0317 | 0.0747 | 0.1330 | 0.0922 | 0.0583 | 0.1330 |

Figure 9:
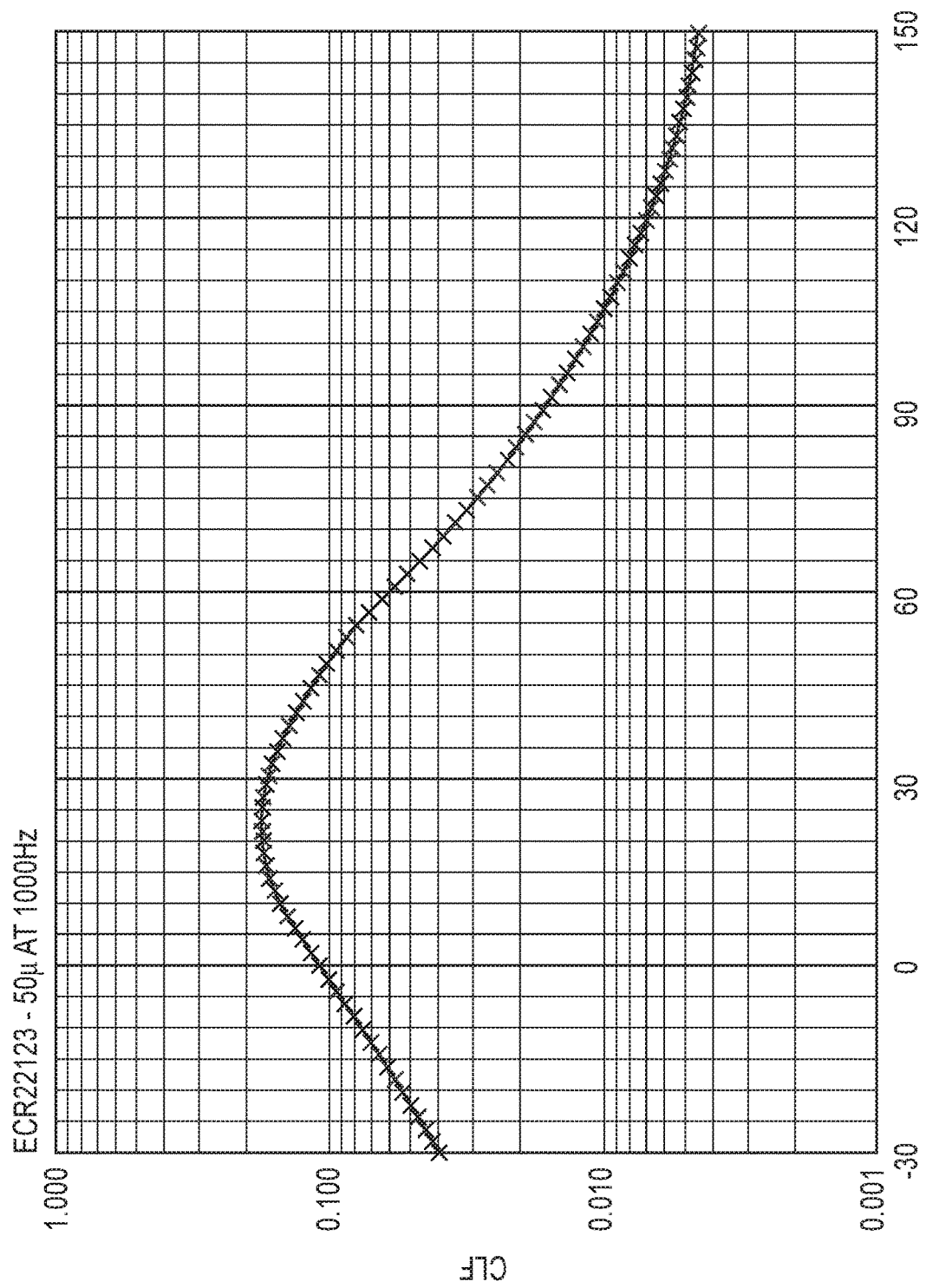
FIG. 9 is a graph of the damping plots for an adhesive in a symmetric assembly in accordance with the present subject matter showing composite loss factor (CLF) versus temperature (° C.) at 1000 Hz.

FIG. 9 is a graph of the damping plots for an adhesive in a symmetric assembly in accordance with the present subject matter showing composite loss factor (CLF) versus temperature (° C.) at 1000 Hz.

TABLE 8

Raw data for FIG. 9 showing the CLF data over a temperature range and peak CLF in accordance with the subject matter

| | Temperature | | | | | Peak CLF |
|---|---|---|---|---|---|---|
| | 0° C. | 20° C. | 40° C. | 60° C. | 80° C. | |
| ECR22123 - 50μ at 1000 Hz | 0.108094 | 0.175615 | 0.131872 | 0.057868 | 0.02241 | 0.176558 |

Figure 10:
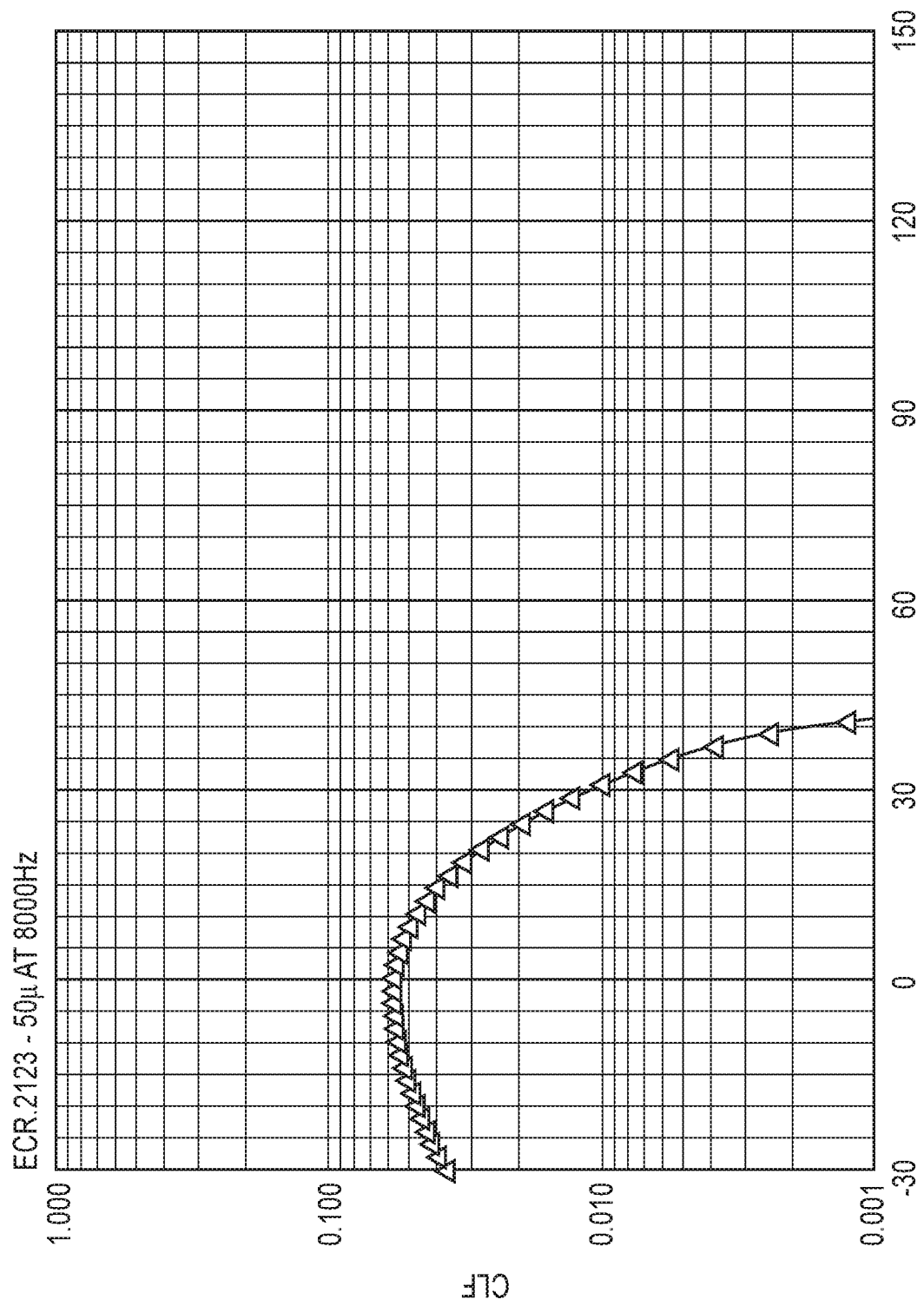
FIG. 10 is a graph of the damping plots for an adhesive in a symmetric assembly in accordance with the present subject matter showing composite loss factor (CLF) versus temperature (° C.) at 8000 Hz.

FIG. 10 is a graph of the damping plots for an adhesive in a symmetric assembly in accordance with the present subject matter showing composite loss factor (CLF) versus temperature (° C.) at 8000 Hz.

TABLE 5

Raw data for FIG. 10 showing the CLF data over a temperature range and peak CLF in accordance with the subject matter.

| | Temperature | | | | | Peak CLF |
|---|---|---|---|---|---|---|
| | 0° C. | 20° C. | 40° C. | 60° C. | 80° C. | |
| ECR22123 - 50μ at 8000 Hz | 0.058981 | 0.028204 | 0.001282 | 0.000815 | 0.000652 | 0.059476 |

Additional Testing

Further, data was collected at different crosslinker levels, as depicted in FIG. 8 and Table 3. The data shows that CLF of 0.10 is not always achieved at all crosslinker levels. A minimum crosslinker level is needed to consistently achieve that value, in this case, the level 2 and 3 crosslinker levels met the 0.1 CLF criteria, but not at level 1 crosslinker. However, the data also shows the significance of the silicone PSA deposition. The level 1 crosslinker level met the 0.10 CLF criteria at the 100 um thickness and not at the 50 um thickness. Table 3. Raw data for FIG. 8 showing the temperature of damping with CLF in the range claimed and the peak CLF and associated temperature.

Figure 11:
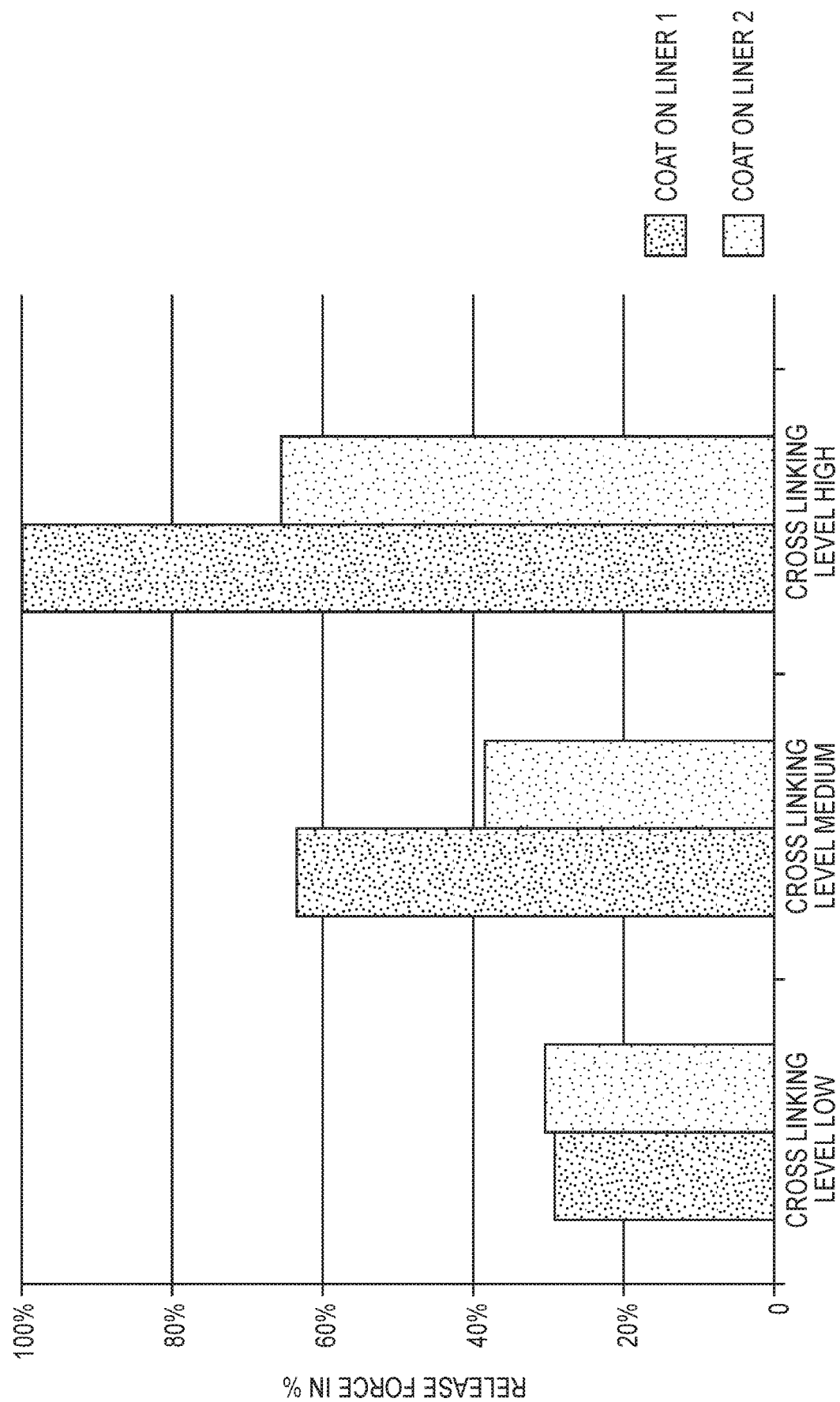
FIG. 11 is a graph of the release performance for a tape product in accordance with the present subject matter when adhesive composition is at three different crosslinker levels.
Figure 12:
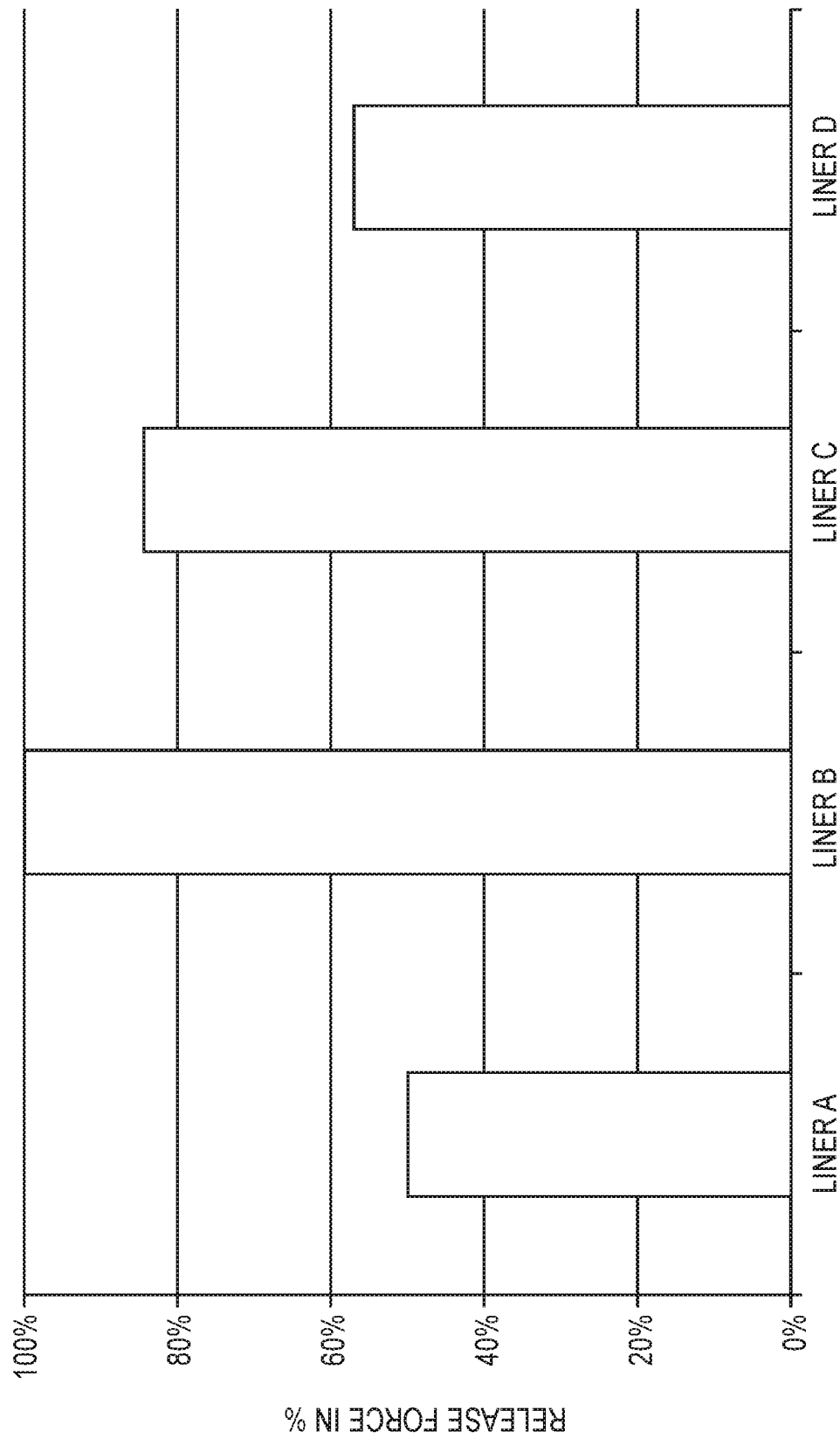
FIG. 12 is a graph of the release performance for a tape product in accordance with the present subject matter using different release liners.

FIG. 11 shows the release performance for the different crosslinker levels. This data clearly shows a reduction in release values with reduced crosslinker level for a particular type of fluorosilicone liner. Hence, reduced crosslinker can be a benefit. FIG. 12 is a graph of the release performance for a tape product in accordance with the present subject matter using different release liners. By using different release liners, release performances are different.

Although the present subject matter has been described in conjunction with welding metal components, it will be understood that other types of workpieces could also be joined together using the vibration damping adhesives of the present subject matter. For example, the workpieces could be formed from composite materials such as fiberglass and/or resin-based polymeric materials.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A weldable and vibration damping adhesive composition comprising:
   a) a silicone-based pressure sensitive adhesive matrix,
   b) metallic particles dispersed in the matrix, and
   c) cross linker;
   wherein the silicone-based pressure sensitive adhesive matrix includes (i) a first silicone adhesive and (ii) a second silicone adhesive, wherein the first silicone adhesive includes a) a polyorganosiloxane gum with in-chain and/or end-chain vinyl functionality and b) a MQ resin and the second silicone adhesive includes a) one or more of a polydimethylsiloxane gum, polymethylphenyl siloxane gum, copolymers of polydimethyl and polymethylphenyl siloxane gum, or copolymers of polydimethyl and polydiphenyl siloxane gum and b) a MQ resin; and wherein the concentration of metallic particles in the adhesive composition is within a range of 0.2 to 10.0 weight percent, wherein the adhesive composition exhibits either a symmetric or asymmetric peak composite loss factor of greater than 0.10 at a frequency of 50 Hz and greater than 0.05 at a frequency of 8,000 Hz.

2. The adhesive composition of claim 1, where the MQ resin contains reactive silanol and/or vinyl functionality, or has no reactive functionality.

3. The adhesive composition of claim 1, further comprising a catalyst.

4. The adhesive composition of claim 3, wherein the catalyst is capable of catalyzing a hydrosilation reaction and is selected from the group consisting of platinum, iron, copper, and/or rhodium.

5. The adhesive composition of claim 1 wherein the adhesive composition is solventless.

6. The adhesive composition of claim 1 wherein the weight ratio of (i) to (ii) is between 95:5 to 55:45.

7. The adhesive composition of claim 1 wherein the weight ratio of (i) to (ii) is between 90:10 to 70:30.

8. The adhesive composition of claim 1 wherein the weight ratio of (i) to (ii) is between 95:5 to 80:20.

9. The adhesive composition of claim 1 wherein the metallic particles include aluminum, iron, silver, or carbon.

10. The adhesive composition of claim 1 wherein the metallic particles include aluminum particulates.

11. The adhesive composition of claim 1 wherein at least 90% of the metallic particulates have a particle size less than 71 microns.

12. The adhesive composition of claim 1 wherein at least 80% of the metallic particles have a particle size less than 45 microns.

13. The adhesive composition of claim 1 wherein the adhesive composition is a pressure sensitive adhesive.

14. The adhesive composition of claim 1 wherein the crosslinker is a peroxide or a compound that contains silicon-hydride functionality.

15. The adhesive composition of claim 14 wherein the peroxide crosslinker is dibenzoylperoxide.

16. A tape comprising:
a) a substrate or a release liner; and
b) an adhesive composition of claim 1.

17. The tape of claim 16, wherein the adhesive composition is disposed on the substrate in at least one layer having a thickness within a range of from 5 microns to 150 microns.

18. The tape of claim 17, wherein the thickness is within a range of from 10 microns to 100 microns.

19. The tape of claim 16 wherein the adhesive composition is disposed on the substrate or the release liner as a single layer.

20. The tape of claim 16 wherein there are two layers of the adhesive composition on the substrate.

21. The tape of claim 20, wherein each layer of the adhesive composition is on oppositely directed faces of the substrate.

22. The tape of claim 16, wherein the adhesive composition is disposed as two or more layers on the same face of the substrate.

* * * * *